United States Patent
Duan (10) Patent No.: US 10,631,144 B2
(45) Date of Patent: Apr. 21, 2020

(54) METHOD AND DEVICE FOR CHARGING TRAFFIC DATA FLOW OF USER EQUIPMENT

(71) Applicant: DATANG MOBILE COMMUNICATIONS EQUIPMENT CO., LTD., Beijing (CN)

(72) Inventor: Jianghai Duan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 5 days.

(21) Appl. No.: 15/779,094

(22) PCT Filed: Jul. 18, 2016

(86) PCT No.: PCT/CN2016/090307
§ 371 (c)(1),
(2) Date: May 25, 2018

(87) PCT Pub. No.: WO2017/088501
PCT Pub. Date: Jun. 1, 2017

(65) Prior Publication Data
US 2018/0359617 A1 Dec. 13, 2018

(30) Foreign Application Priority Data
Nov. 27, 2015 (CN) .......................... 2015 1 0850299

(51) Int. Cl.
*H04M 11/00* (2006.01)
*H04W 4/24* (2018.01)
(Continued)

(52) U.S. Cl.
CPC ............... *H04W 4/24* (2013.01); *H04L 12/14* (2013.01); *H04L 12/1403* (2013.01);
(Continued)

(58) Field of Classification Search
CPC ....... H04W 4/24; H04M 15/59; H04M 15/31; H04M 15/00; H04M 2215/48; H04L 12/14; H04L 12/1403
(Continued)

(56) References Cited

U.S. PATENT DOCUMENTS 6,347,224 B1 * 2/2002 Smyth .................. H04M 15/00
455/406
2007/0156547 A1 * 7/2007 Dai ....................... G06Q 20/102
705/34

(Continued)

FOREIGN PATENT DOCUMENTS

CN 103188759 A 7/2003
CN 1968105 A 5/2007
(Continued)

OTHER PUBLICATIONS

Vodafone. "Impact on Lawful Interception of Mobile Edge Computing", 3GPP TSG SA3-LI Meeting #55 SA3LI14-167, Oct. 30, 2014 (Oct. 30, 2014), the whole document.
(Continued)

*Primary Examiner* — Khoi H Tran
*Assistant Examiner* — B M M Hannan
(74) *Attorney, Agent, or Firm* — Kilpatrick Townsend & Stockton, LLP (57) ABSTRACT

Disclosed are a charging method and device configured to realize charging for a local service without affecting an existing charging procedure when a service platform is deployed at a base station side. The charging method of the invention comprises: when a mobile edge computing gateway (MEC-GW) determines that a user equipment (UE) is to be charged for a local service, transmitting, to a mobile edge computing (MEC) server, a message requesting calculation of local service information associated with the UE;
(Continued)

receiving, by the MEC-GW, local service calculation information associated with the UE transmitted by the MEC server, and generating, according to the local service calculation information associated with the UE, a charging data record for the local service associated with the UE; and transmitting, by the MEC-GW, the charging data record for the local service to a charging gate (CG).

14 Claims, 7 Drawing Sheets

(51) Int. Cl.
   *H04L 12/14* (2006.01)
   *H04M 15/00* (2006.01)
(52) U.S. Cl.
   CPC ........... *H04M 15/00* (2013.01); *H04M 15/31* (2013.01); *H04M 15/59* (2013.01); *H04M 2215/48* (2013.01)
(58) Field of Classification Search
   USPC .................................................. 455/406, 408
   See application file for complete search history.

(56) References Cited

U.S. PATENT DOCUMENTS

| | | | | |
|---|---|---|---|---|
| 2012/0008523 A1* | 1/2012 | Zhou | ........................ | H04L 12/14 370/252 |
| 2012/0269134 A1* | 10/2012 | Jin | ...................... | H04W 28/085 370/328 |
| 2013/0322344 A1* | 12/2013 | Li | ........................... | H04W 8/10 370/328 |
| 2015/0111532 A1* | 4/2015 | Cai | ..................... | H04L 41/0654 455/406 |
| 2015/0163365 A1* | 6/2015 | Qiu | ....................... | H04M 15/41 370/259 |
| 2015/0319003 A1* | 11/2015 | Qiu | ..................... | H04L 12/1482 455/406 |
| 2018/0077294 A1* | 3/2018 | Rasanen | ............. | H04L 12/1407 |

FOREIGN PATENT DOCUMENTS

| | | |
|---|---|---|
| CN | 101771987 A | 7/2010 |
| CN | 101998347 A | 3/2011 |
| CN | 102209309 A | 10/2011 |
| CN | 101771987 B | 12/2012 |
| EP | 0509256 A1 | 10/1992 |
| EP | 2846566 A1 | 3/2015 |
| WO | 2011023061 A1 | 3/2011 |
| WO | 2014130446 A1 | 8/2014 |
| WO | 2017088501 A1 | 6/2017 |

OTHER PUBLICATIONS

International Search Report dated Oct. 9, 2016 in the corresponding CN application(application No. PCT/CN2016/090307).

Huawei, et al., "Mobile-Edge Computing", Mobile-Edge Computing—Introductory Technical White Paper, European Telecommunications Standards Institute (ETSI), on Dec. 16, 2014, total 36 pages.

* cited by examiner

METHOD AND DEVICE FOR CHARGING TRAFFIC DATA FLOW OF USER EQUIPMENT

This application is a National Stage of International Application No. PCT/CN2016/090307, filed Jul. 18, 2016, which claims priority to Chinese Patent Application No. 201510850299.4, filed Nov. 27, 2015, both of which are hereby incorporated by reference in their entireties.

FIELD

The present invention relates to the field of communications, and particularly to a charging method and apparatus.

BACKGROUND

In the existing charging network architecture, after a traffic platform is deployed in a core network, all the traffic data flows are routed through a Serving Gateway (S-GW) and a Packet data network Gateway (P-GW), so that a charging data bill can be generated, and a user can be charged accordingly.

As a 5G network has been proposed, the concept of Mobile Edge Content and Computing (MECC) has been further proposed. The concept of MECC refers to that an information technology serving environment and a cloud computing capability are provided at the position of a mobile user, and contents are distributed and pushed to the proximate network side (e.g., a base station), so that applications, traffic and contents are deployed in a highly distributed environment to thereby better satisfy a low delay and a high bandwidth requirements of traffic in the 5G network.

However some low-delay and high-bandwidth traffic application platform is deployed proximate to the base station side in the 5G network, so that these traffic data are not routed through the core network, so an operator cannot charge the user for the traffic in the existing charging architecture.

SUMMARY

In view of this, embodiments of the invention provide a charging method and apparatus so as to charge a user for a local traffic without affecting the existing charging flow when a traffic platform is deployed at the base station side.

An embodiment of the invention provides a charging method including: upon determining that a user Equipment (UE) is to be charged for a local traffic, transmitting, by a Mobile Edge Computing Gateway (MEC-GW), a request message to a Mobile Edge Computing (MEC) server to make a statistic of local traffic information of the UE; receiving, by the MEC-GW, statistic information of the local traffic of the UE transmitted by the MEC server, and generating a charging data bill of the local traffic of the UE according to the statistic information of the local traffic of the UE; and transmitting, by the MEC-GW, the charging data bill of the local traffic of the UE to a Charging Gateway (CG).

In the method according to the embodiment of the invention, the MEC server arranged at the base station side makes a statistic of the local traffic information of the UE, and reports the statistic information of the local traffic of the UE to the MEC-GW arranged at the core network side, and the MEC-GW at the core network side generates the charging data bill of the local traffic of the UE according to the statistic information of the local traffic of the UE transmitted by the MEC server, and transmits the charging data bill of the local traffic of the UE to the CG, so that the MEC server arranged at the base station side, and the MEC-GW arranged at the core network side can charge the UE for the local traffic without affecting the existing charging flow in the case that the traffic platform is deployed at the base station side.

Preferably determining, by the MEC-GW, that the UE is to be charged for the local traffic includes: receiving, by the MEC-GW, an instruction message transmitted by a Packet data network Gateway (P-GW) to charge the UE for the local traffic; and determining, by the MEC-GW, that the UE is to be charged for the local traffic, according to the instruction message to charge the UE for the local traffic.

Preferably after the MEC-GW determines that the UE is to be charged for the local traffic, and before the MEC-GW transmits the request message to the MEC server to make the statistic of the local traffic information of the UE, the method further includes: transmitting, by the MEC-GW, an acknowledgement message for charging the UE for the local traffic to the P-GW.

Preferably the instruction message includes an identifier of a cell where the UE resides; and transmitting, by the MEC-GW, the request message to the MEC server to make the statistic of the local traffic information of the UE includes: determining, by the MEC-GW, a local area identifier corresponding to a cell where the UE resides, according to the identifier of the cell where the UE resides; determining, by the MEC-GW, an MEC server corresponding to a local area according to the local area identifier; and transmitting, by the MEC-GW, the request message to the MEC server corresponding to the local area to make the statistic of the local traffic of the UE.

An embodiment of the invention provides a charging method including: determining, by a Packet data network Gateway (P-GW), that a User Equipment (UE) is to be charged for a local traffic; and transmitting, by the P-GW, an instruction message to a Mobile Edge Computing Gateway (MEC-GW) to charge the UE for the local traffic.

Preferably after the P-GW transmits the instruction message to the MEC-GW to charge the UE for the local traffic, the method further includes: receiving, by the P-GW, an acknowledgement message transmitted by the MEC-GW for charging the UE for the local traffic.

An embodiment of the invention provides a charging method including: receiving, by a Mobile Edge Computing (MEC) server, a request message transmitted by a Mobile Edge Computing Gateway (MEC-GW) to make a statistic of local traffic information of a User Equipment (UE), wherein the request message is transmitted by the MEC-GW to the MEC server upon reception of an instruction message transmitted by a Packet data network Gateway (P-GW) to charge the UE for a local traffic; determining, by the MEC server, information to be reported among the local traffic information of the UE, according to the request message; and making and then transmitting, by the MEC server, a statistic of the information to be reported, to the MEC-GW, so that the MEC-GW generates and then transmits a charging data bill of the local traffic of the UE to a Charging Gateway (CG) according to the reported information.

Preferably the request message includes an identifier of the UE, a charging rule, and an identifier of each IP Connectivity Access Network (IP-CAN) bearer of the UE; and determining, by the MEC server, the information to be reported among the local traffic information of the UE, according to the request message includes: determining, by the MEC server, local traffic information corresponding to the UE according to the identifier of the UE; and determining, by the MEC server, information to be reported among the local traffic information corresponding to the UE according to the charging rule and the identifier of each IP-CAN bearer of the UE.

Preferably before the MEC server makes and then transmits the statistic of the information to be reported, to the MEC-GW, the method further includes: replying, by the MEC server, to the MEC-GW with a response message for making the statistic of the local traffic information of the UE.

An embodiment of the invention provides a charging method including: receiving, by a Charging Gateway (CG), a charging data bill of a local traffic of a User Equipment (UE) transmitted by a Mobile Edge Computing Gateway (MEC-GW); and transmitting, by the CG the charging data bill of the local traffic of the UE to a Business and Operation Support System (BOSS).

Preferably the method further includes: receiving, by the CG, a charging data bill of a non-local traffic of the UE transmitted by a Serving Gateway (S-GW) and a Packet data network Gateway (P-GW); and merging, by the CG, the charging data bill of the local traffic of the UE, and the charging data bill of the non-local traffic of the UE transmitted by the S-GW and the P-GW, and transmitting a resulting charging data bill of the UE to the BOSS.

Preferably merging, by the CG, the charging data bill of the local traffic of the UE, and the charging data bill of the non-local traffic of the UE transmitted by the S-GW and the P-GW includes: merging, by the CG, charging data bills of the UE according to an identifier of the UE, a charging ID corresponding to each IP-CAN bearer of the UE, and an address of the P-GW, in the charging data bill of the local traffic, and the identifier of the UE, the charging ID corresponding to each IP-CAN bearer of the UE, an address of the S-GW, and the address of the P-GW, in the charging data bill of the non-local traffic.

An embodiment of the invention provides a charging apparatus including: a determining module configured to determine that a user Equipment (UE) is to be charged for a local traffic; a first transmitting module configured to transmit a request message to a Mobile Edge Computing (MEC) server to make a statistic of local traffic information of the UE, when the determining module determines that the UE is to be charged for the local traffic; and a second transmitting module configured to transmit a charging data bill of the local traffic of the UE to a Charging Gateway (CG).

Preferably the determining module is configured to: receive an instruction message transmitted by a Packet data network Gateway (P-GW) to charge the UE for the local traffic; and determine that the UE is to be charged for the local traffic, according to the instruction message to charge the UE for the local traffic.

Preferably the apparatus further includes a third transmitting module configured, after the determining module determines that the UE is to be charged for the local traffic, and before the second transmitting module transmits the request message to the MEC server to make the statistic of the local traffic information of the UE, to transmit an acknowledgement message for charging the UE for the local traffic to the P-GW.

Preferably the instruction message includes an identifier of a cell where the UE resides; and the first transmitting module is configured to: determine a local area identifier corresponding to the cell where the UE resides, according to the identifier of the cell where the UE resides; determine an MEC server corresponding to a local area according to the local area identifier; and transmit the request message to the MEC server corresponding to the local area to make the statistic of the local traffic of the UE.

An embodiment of the invention provides a second charging apparatus including: a determining module configured to determine that a User Equipment (UE) is to be charged for a local traffic; and a transmitting module configured to transmit an instruction message to a Mobile Edge Computing Gateway (MEC-GW) to charge the UE for the local traffic.

Preferably the transmitting module in the second charging apparatus is further configured: after the instruction message is transmitted to the MEC-GW to charge the UE for the local traffic, to receive an acknowledgement message transmitted by the MEC-GW for charging the UE for the local traffic.

An embodiment of the invention provides a third charging apparatus including: a receiving module configured to receive a request message transmitted by a Mobile Edge Computing Gateway (MEC-GW) to make a statistic of local traffic information of a User Equipment (UE), wherein the request message is transmitted by the MEC-GW to an MEC server upon reception of an instruction message transmitted by a Packet data network Gateway (P-GW) to charge the UE for a local traffic; a determining module configured to determine information to be reported among the local traffic information of the UE, according to the request message; and a transmitting module configured to make and then transmit a statistic of the information to be reported, to the MEC-GW, so that the MEC-GW generates and then transmits a charging data bill of the local traffic of the UE to a Charging Gateway (CG) according to the reported information.

Preferably the request message includes an identifier of the UE, a charging rule, and an identifier of each IP-CAN bearer of the UE; and the determining module in the third charging apparatus is configured to: determine local traffic information corresponding to the UE according to the identifier of the UE; and determine information to be reported among the local traffic information corresponding to the UE according to the charging rule and the identifier of each IP-CAN bearer of the UE.

Preferably the transmitting module in the third charging apparatus is further configured: before statistic information to be reported is transmitted to the MEC-GW, to transmit a response message to the MEC-GW for making the statistic of the local traffic information of the UE.

An embodiment of the invention provides a fourth charging apparatus including: a receiving module configured to receive a charging data bill of a local traffic of a User Equipment (UE) transmitted by a Mobile Edge Computing Gateway (MEC-GW); and a transmitting module configured to transmit the charging data bill of the local traffic of the UE to a Business and Operation Support System (BOSS).

Preferably the receiving module in the fourth charging apparatus is further configured to: receive a charging data bill of a non-local traffic of the UE transmitted by a Serving Gateway (S-GW) and a Packet data network Gateway (P-GW); and the transmitting module in the fourth charging apparatus is further configured to: merge the charging data bill of the local traffic of the UE, and the charging data bill of the non-local traffic of the UE transmitted by the S-GW and the P-GW, and transmit a resulting charging data bill of the UE to the BOSS.

Preferably the transmitting module in the fourth charging apparatus is configured to merge the charging data bill of the local traffic of the UE, and the charging data bill of the non-local traffic of the UE transmitted by the S-GW and the P-GW by merging charging data bills of the UE according to an identifier of the UE, a charging ID corresponding to each IP-CAN bearer of the UE, and an address of the P-GW, in the charging data bill of the local traffic, and the identifier of the UE, the charging ID corresponding to each IP-CAN bearer of the UE, an address of the S-GW, and the address of the P-GW, in the charging data bill of the non-local traffic.

DETAILED DESCRIPTION OF THE EMBODIMENTS

The embodiments of the invention provide a charging method and apparatus so as to charge a user for a local traffic in the existing charging flow when a traffic platform is deployed at the base station side.

In order to make the objects, technical solutions, and advantages of the invention more apparent, the invention will be described below in further details with reference to the drawings and the embodiments thereof. It shall be appreciated that the particular embodiments described here are merely intended to illustrate the invention, but not to limit the invention thereto.

Figure 1:
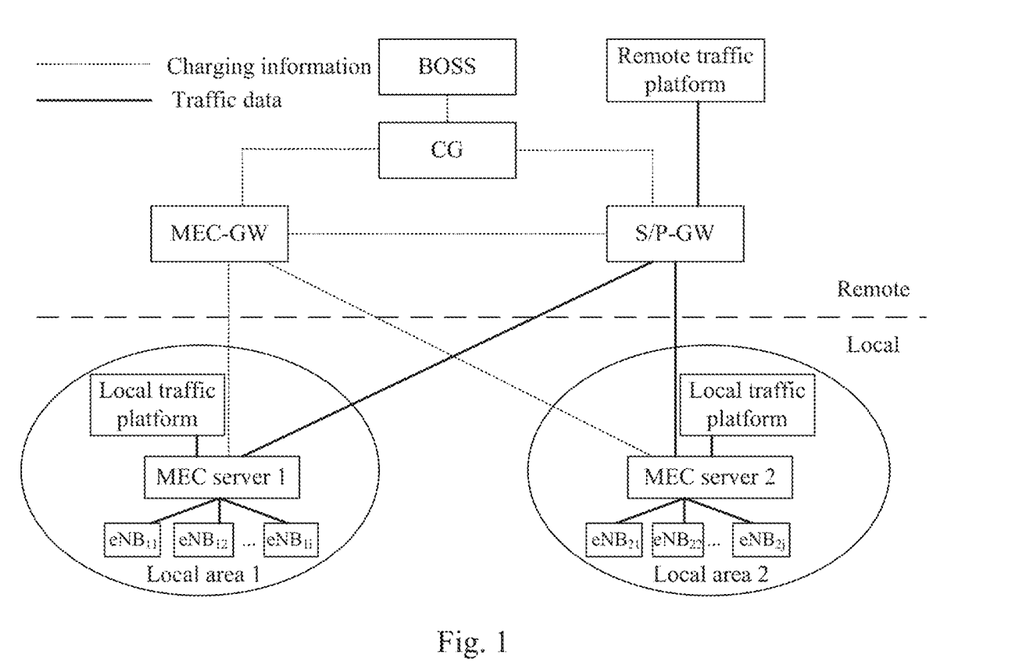
FIG. 1 is a schematic diagram of network architecture according to an embodiment of the invention.

FIG. 1 illustrates a schematic diagram of network architecture according to an embodiment of the invention.

Here a traffic application deployed at the base station side will be referred to as a local traffic corresponding to a local traffic platform. Correspondingly a non-local traffic application deployed after a core network (P-GW) will be referred to a remote traffic corresponding to a remote traffic platform. Furthermore in the figure, a dotted line represents a transmission path of charging information, and a solid line represents a transmission path of traffic data.

In the network architecture, there are an evolved Node B (eNB), an S-GW, a P-GW, a CG, a BOSS, an MEC server, an MEC-GW, a local traffic platform, a remote traffic platform, and other functional entities, where the S/P-GW as illustrated represents the S-GW and the P-GW deployed in the same physical device. Furthermore all the data being exchanged between the respective functional entities as illustrated can be transmitted over a transmission network (e.g., a PTN network).

The MEC server is deployed locally, and responsible for offloading a local traffic and a remote traffic, where for the local traffic, a traffic data flow thereof runs through the eNB, the MEC server, and the local traffic platform in that order; and for the remote traffic, a traffic data flow thereof runs through the eNB, the MEC server, the S/P-GW, and the remote traffic platform in that order. The local traffic platform and/or the remote traffic platform can include a plurality of applications, e.g., video, cloud storage, communication, intelligent home, a mobile medical care, industry control, the Internet of Vehicles, etc. Since the local traffic platform is deployed proximate to the base station side, bandwidth consumption of the transmission network can be lowered, a delay over the transmission t network can be lowered, and a user experience can be improved.

The MEC-GW is a logical and functional entity, and can be deployed separately in a physical device, or can be deployed in a physical device together with the S-GW and the P-GW, although the embodiments of the invention will not be limited thereto. The MEC-GW is deployed remotely (at the core network side), connected with a plurality of MEC servers over the transmission network, and responsible for controlling charging for a local traffic.

In a particular implementation, an interface can be defined between the MEC-GW and the CG, and an interface can be defined between the MEC-GW and the P-GW, so that charging information can be exchanged between the MEC-GW and the CG, and between the MEC-GW and the P-GW to thereby charge a user for a local traffic.

A charging method for a local traffic according to an embodiment of the invention will be introduced below in brief as a whole.

When the P-GW determines that a UE is to be charged for a local traffic, the P-GW transmits an instruction message to the MEC-GW to charge the UE for the local traffic; the MEC-GW transmits a request message to an MEC server in a local area to make a statistic of the local traffic of the UE upon reception of the instruction message; the MEC server makes and then reports a statistic of the local traffic of the UE to the MEC-GW upon reception of the request message; the MEC-GW generates a charging data bill of the local traffic of the UE according to the report message transmitted by the MEC server, and transmits the charging data bill of the local traffic of the UE to the CG; and the CG merges and then transmits charging data bills of the UE to the BOSS.

Furthermore different MEC servers are deployed in different local areas, e.g., an MEC server 1 in a local area 1, and an MEC server 2 in a local area 2 as illustrated in FIG. 1, and when the UE is charged for a local traffic in the different local areas, the MEC servers corresponding to the local areas where the UE is served can make a statistic and then report local traffic information of the UE to the remotely deployed MEC-GW (as illustrated in FIG. 1), and the MEC-GW generates the charging data bills of the local traffic of the UE in the different areas according to the report messages transmitted by the MEC servers in the different local areas, and transmits the charging data bills of the local traffic of the UE in the different areas respectively to the CG; and the CG merges and then transmits the charging data bills of the same UE to the BOSS, so that the BOSS takes and operationally analyzes the bill to enable an operator to comprehensively and conveniently grasp accesses to the different local traffic applications in the different local areas so as to subsequently spread them accordingly.

The charging method according to the embodiments of the invention at the different network functional entity sides will be described below in details.

Figure 2:
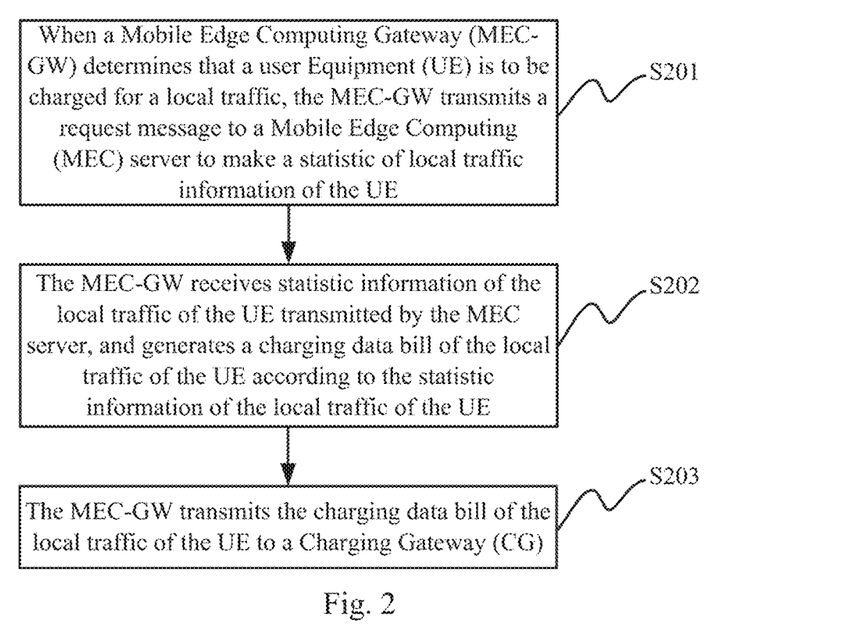
FIG. 2 is a schematic flow chart of a charging method according to an embodiment of the invention.

FIG. 2 illustrates a charging method according to an embodiment of the invention at the MEC-GW side, where the method includes following operations.

S201. When a Mobile Edge Computing Gateway (MEC-GW) determines that a user Equipment (UE) is to be charged for a local traffic, the MEC-GW transmits a request message to a Mobile Edge Computing (MEC) server to make a statistic of local traffic information of the UE.

S202. The MEC-GW receives statistic information of the local traffic of the UE transmitted by the MEC server, and generates a charging data bill of the local traffic of the UE according to the statistic information of the local traffic of the UE.

S203. The MEC-GW transmits the charging data bill of the local traffic of the UE to a Charging Gateway (CG).

Preferably the MEC-GW determines that the UE is to be charged for the local traffic as follows: the MEC-GW receives an instruction message transmitted by a Packet data network Gateway (P-GW) to charge the UE for the local traffic; and the MEC-GW determines that the UE is to be charged for the local traffic, according to the instruction message to charge the UE for the local traffic.

Preferably the instruction message includes the following information: a charging reason, an identifier of the UE, an identifier of a cell where the UE resides, an address of the P-GW, an identifier of each IP-CAN bearer of the UE, a charging Identifier (ID) of each IP-CAN bearer of the UE, and a charging rule.

Here the charging reason above can be an IP-CAN session being set up, an IP-CAN session being released, etc., for example. The identifier above of the UE can be any one or combination of the following identifiers: an International Mobile Subscriber (IMSI) of the UE, a Mobile Subscriber Integrated Services Digital Network Number (MSISDN) of the UE, an IP address of the UE, etc., and identifiers of UEs can be set according to different UEs, but will not be limited to the identifiers above.

Furthermore the charging ID above corresponding to each IP-CAN bearer of the UE is a charging identifier allocated by the P-GW for each IP-CAN bearer of the UE while setting up an IP-CAN session with the UE, carrying the charging identifier in the instruction message, and transmitting the instruction message to the MEC-GW, so that the MEC-GW can distinguish charging traffic information corresponding to different bearers of the UE from each other according to the charging ID corresponding to each IP-CAN bearer of the UE.

Preferably the MEC-GW creates a binding relationship between the identifier of the UE, and an IP-CAN bearer identifier of the UE, and a charging ID corresponding to the IP-CAN bearer identifier of the UE upon determining that the UE is to be charged for the local traffic.

Preferably after the MEC-GW determines that the UE is to be charged for the local traffic, and before the MEC-GW transmits the request message to the MEC server to make a statistic of the local traffic information of the UE, the method further includes: the MEC-GW transmits an acknowledgement message for charging the UE for the local traffic to the P-GW.

Stated otherwise, after the MEC-GW determines that the UE is to be charged for the local traffic, the MEC-GW transmits the acknowledgement message for charging the UE for the local traffic to the P-GW, and thereafter transmits the request message to the MEC server to make a statistic of the local traffic information of the UE.

Preferably the MEC-GW transmits the request message to the MEC server to make the statistic of the local traffic information of the UE as follows: the MEC-GW determines an identifier of a local area corresponding to the cell where the UE resides, according to the identifier of the cell where the UE resides; the MEC-GW determines an MEC server corresponding to the local area according to the identifier of the local area; and the MEC-GW transmits the request message to the MEC server corresponding to the local area to make the statistic of the local traffic of the UE.

Preferably a correspondence relationship between the identifiers of cells covered by different base stations, and local area identifiers, and a correspondence relationship between local area identifiers and MEC servers can be preconfigured in the MEC-GW, so that the MEC-GW can determine a local area identifier corresponding to the identifier of the cell where the UE resides, according to the identifier of the cell where the UE resides, further determine an MEC server corresponding to the local area identifier according to the local area identifier, and finally transmit the request message to the MEC server corresponding to the local area identifier to make a statistic of the local traffic of the UE.

Preferably the charging data bill of the local traffic of the UE generated by the MEC-GW according to the statistic information of the local traffic of the UE transmitted by the MEC server in the operation S202 can include the following information, for example: the identifier of the UE, the identifier of the local area where the UE is served, the statistic information of the local traffic, the address of the P-GW, and the charging ID corresponding to each IP-CAN bearer of the UE. Particularly the statistic information of the local traffic is generated under the charging rule, and for example, charging based upon traffic is required in the charging rule, so the statistic information of the local traffic is information about traffic consumed by the UE to enforce each traffic application, and may also carry an identifier of each application.

Figure 3:
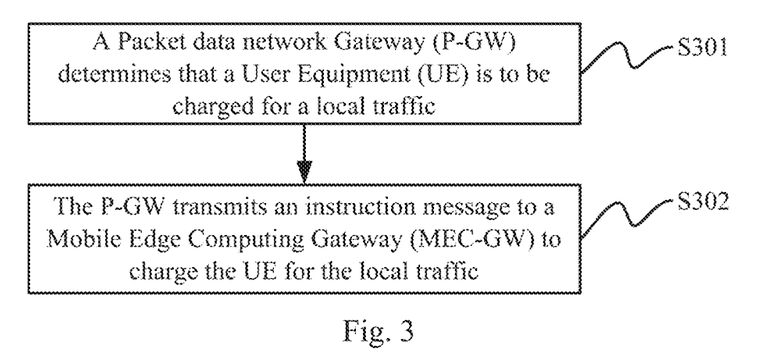
FIG. 3 is a schematic flow chart of a second charging method according to an embodiment of the invention.

FIG. 3 illustrates a charging method according to an embodiment of the invention at the P-GW side, where the method includes following operations.

In S301, a Packet data network Gateway (P-GW) determines that a User Equipment (UE) is to be charged for a local traffic.

In S302, the P-GW transmits an instruction message to a Mobile Edge Computing Gateway (MEC-GW) to charge the UE for the local traffic.

Here the P-GW can determine that the UE is to be charged for the local traffic, for example, when the UE sets up an IP-CAN session with the P-GW, when an IP-CAN session between the UE and the P-GW is released, etc., although the embodiment of the invention will not be limited thereto.

It shall be noted that the P-GW allocates a charging ID for each IP-CAN bearer of the UE while setting up an IP-CAN session with the UE. Furthermore for the charging ID corresponding to each IP-CAN bearer of the UE, when the P-GW is to charge the UE for a remote traffic of the IP-CAN bearer, the P-GW charges the UE for the remote traffic using the charging ID corresponding to the IP-CAN bearer; and when the P-GW is to charge the UE for a local traffic of the IP-CAN bearer, the P-GW transmits the charging ID corresponding to the IP-CAN bearer to the MEC-GW, and the MEC-GW charges the UE for the local traffic using the charging ID corresponding to the IP-CAN bearer. Stated otherwise, for the same IP-CAN bearer, there is a unique charging ID corresponding thereto, and the UE is charged for both a local traffic and a remote traffic of the same IP-CAN bearer using the same charging ID.

Preferably the instruction message transmitted by the P-GW to charge the UE for the local traffic includes the following information: a charging reason, an identifier of the UE, an identifier of a cell where the UE resides, an address of the P-GW, an identifier of each IP-CAN bearer of the UE, a charging ID of each IP-CAN bearer of the UE, and a charging rule.

The charging rule can be charging based upon traffic, charging based upon a length of time, charging based upon content, etc., although the embodiment of the invention will not be limited thereto.

Preferably after the P-GW transmits the instruction message to the MEC-GW to charge the UE for the local traffic, the method further includes: the P-GW receives an acknowledgement message transmitted by the MEC-GW for charging the UE for the local traffic.

It shall be noted that the charging method according to the embodiment of the invention used to charge the UE for a local traffic can be used to charge a plurality of different UEs for a local traffic concurrently. Furthermore the charging method according to the embodiment of the invention can be performed without affecting the existing charging flow, that is, the P-GW can charge the UE for a remote traffic while instructing the MEC-GW to control charging for a local traffic of the UE, so that an S-GW and the P-GW charge the UE for the remote traffic, and generates a charging data bill of the remote traffic of the UE; the MEC-GW generates a charging data bill of the local traffic of the UE; and the CG merges and then transmits the charging data bill of the local traffic, and the charging data bill of the remote traffic of the same UE to a BOSS, which thus charges the UE for the local traffic and the remote traffic.

Figure 4:
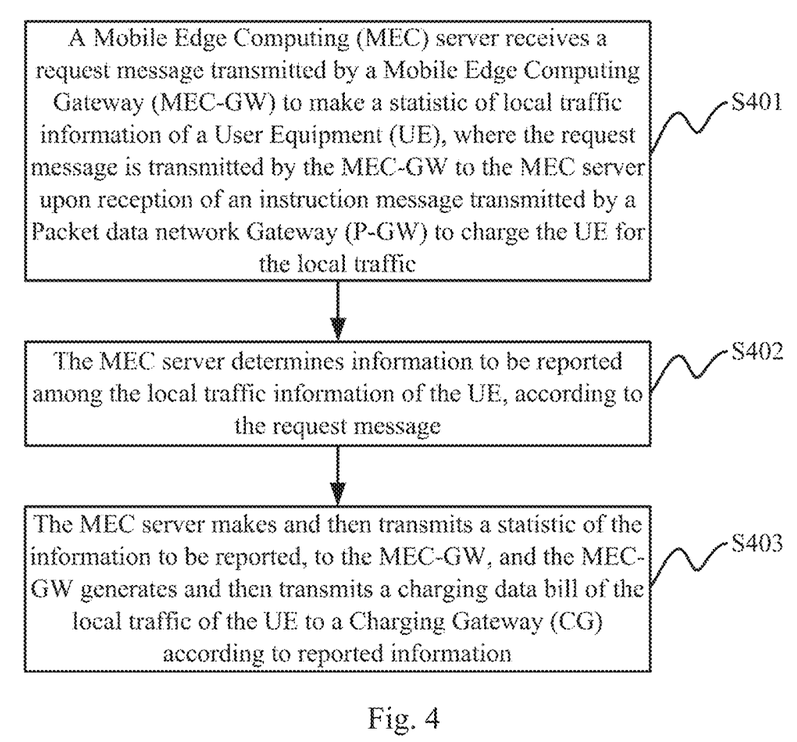
FIG. 4 is a schematic flow chart of a third charging method according to an embodiment of the invention.

FIG. 4 illustrates a charging method according to an embodiment of the invention at the MEC server side, where the method includes following operations.

S401. A Mobile Edge Computing (MEC) server receives a request message transmitted by a Mobile Edge Computing Gateway (MEC-GW) to make a statistic of local traffic information of a User Equipment (UE), where the request message is transmitted by the MEC-GW to the MEC server upon reception of an instruction message transmitted by a Packet data network Gateway (P-GW) to charge the UE for the local traffic.

Preferably the request message transmitted by the MEC-GW to make a statistic of the local traffic information of the UE carries an identifier of the UE, a charging rule, and an identifier of each IP-CAN bearer of the UE.

S402. The MEC server determines information to be reported among the local traffic information of the UE, according to the request message.

S403. The MEC server makes and then transmits a statistic of the information to be reported, to the MEC-GW, and the MEC-GW generates and then transmits a charging data bill of the local traffic of the UE to a Charging Gateway (CG) according to reported information.

Preferably in the operation S402: the MEC server determines local traffic information corresponding to the UE according to the identifier of the UE in the request message; and the MEC server determines information to be reported among the local traffic information corresponding to the UE according to the charging rule, and the identifier of each IP-CAN bearer of the UE in the request message.

For example, the charging rule requires a report based upon an access length of time, so the information to be reported is the access length of time of each local traffic application corresponding to each IP-CAN bearer of the UE.

Preferably the MEC server can make a statistic of the information to be reported, and then transmit it to the MEC-GW periodically or upon being triggered by an event, although the embodiment of the invention will not be limited thereto. Furthermore preferably the MEDC server can report the local traffic of the UE at a granularity of a specific application in the local traffic, and for example, there are an Internet access application, a video application, and a communication application in the local traffic of the UE, so the MEC server reports the local traffic of the UE by making and then reporting a statistic of information based upon the Internet access application, information based upon the video application, and information based upon the communication application respectively.

Preferably before the MEC server makes and then transmits a statistic of the information to be reported, to the MEC-GW, the method further includes: the MEC server transmits to the MEC-GW with a response message for making a statistic of the local traffic information of the UE.

Stated otherwise, the MEC server replies to the MEC-GW with the response message upon reception of the request message transmitted by the MEC-GW for making a statistic of the local traffic information of the UE. Thereafter the MEC server makes and then transmits a statistic of the information to be reported, to the MEC-GW.

Figure 5:
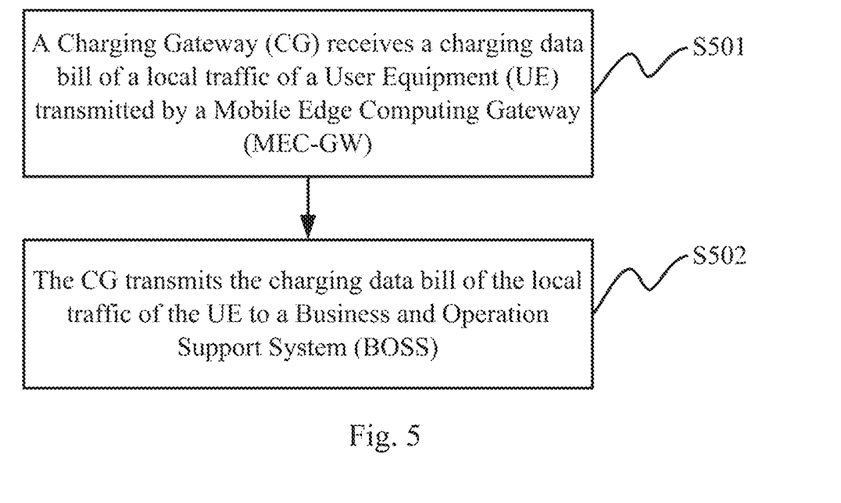
FIG. 5 is a schematic flow chart of a fourth charging method according to an embodiment of the invention.

FIG. 5 illustrates a charging method according to an embodiment of the invention at the CG side, where the method includes following operations.

S501. A Charging Gateway (CG) receives a charging data bill of a local traffic of a User Equipment (UE) transmitted by a Mobile Edge Computing Gateway (MEC-GW).

S502. The CG transmits the charging data bill of the local traffic of the UE to a Business and Operation Support System (BOSS).

Preferably the method further includes: the CG receives a charging data bill of a non-local traffic of the UE transmitted by a Serving Gateway (S-GW) and a Packet data network Gateway (P-GW); and the CG merges the charging data bill of the local traffic of the UE, and the charging data bill of the non-local traffic of the UE transmitted by the S-GW and the P-GW, and transmits a resulting charging data bill of the UE to the BOSS.

Stated otherwise, the CG receives both the charging data bill of the local traffic of the UE transmitted by the MEC-GW, and the charging data bill of the non-local traffic (a remote traffic) of the UE transmitted by the S-GW and the P-GW. Apparently the charging method according to the embodiment of the invention can be performed without affecting the existing charging flow for a remote traffic.

Preferably the CG merges the charging data bill of the local traffic of the UE, and the charging data bill of the non-local traffic of the UE transmitted by the S-GW and the P-GW as follows: the CG merges charging data bills of the UE according to an identifier of the UE, a charging ID corresponding to each IP-CAN bearer of the UE, and an address of the P-GW, in the charging data bill of the local traffic, and the identifier of the UE, the charging ID corresponding to each IP-CAN bearer of the UE, an address of the S-GW, and the address of the P-GW, in the charging data bill of the non-local traffic.

Preferably the CG can set a timer, and receive the charging data bill of the local traffic of the UE transmitted by the MEC-GW, and the charging data bill of the non-local traffic of the UE transmitted by the S-GW and the P-GW, and after a specified period of time elapses, the CG merges charging data bills of the same UE; or of course, the CG can alternatively merge charging data bills for the same IP-CAN bearer traffic of the same UE under a charging rule, although the embodiment of the invention will not be limited thereto. Furthermore in a particular implementation, the CG can merge the charging data bills of the UE as needed in practical, can merge them only once as instructed, or can merge them periodically, although the embodiment of the invention will not be limited thereto.

Preferably the resulting charging data bill of the same UE includes both the charging data bill of the local traffic of the UE, and the charging data bill of the remote traffic of the UE. Furthermore preferably the charging data bill of the local traffic of the UE can include the following information: the identifier of the UE, an identifier of a local area where the UE is served, statistic information of each application in the local traffic of the UE, the address of the P-GW, and the charging ID corresponding to each IP-CAN bearer of the UE; and the charging data bill of the remote traffic of the UE can include the following information: the identifier of the UE, the identifier of the local area where the UE is served, statistic information of each application in the remote traffic of the UE, the address of the P-GW, the address of the S-GW, and the charging ID corresponding to each IP-CAN bearer of the UE.

In this way, after the CG transmits the resulting charging data bill including the information above to the BOSS, an operator can take and operationally analyze the bill through the BOSS to comprehensively and conveniently grasp accesses to different local traffic applications in different local areas so as to subsequently spread them accordingly. Furthermore the BOSS can also set different rates respectively for the local traffic and the remote traffic, e.g., ¥0.5 per IMB of traffic for the local traffic, and ¥1.0 per IMB of traffic for the remote traffic.

Particular embodiments will be given below.

Figure 6:
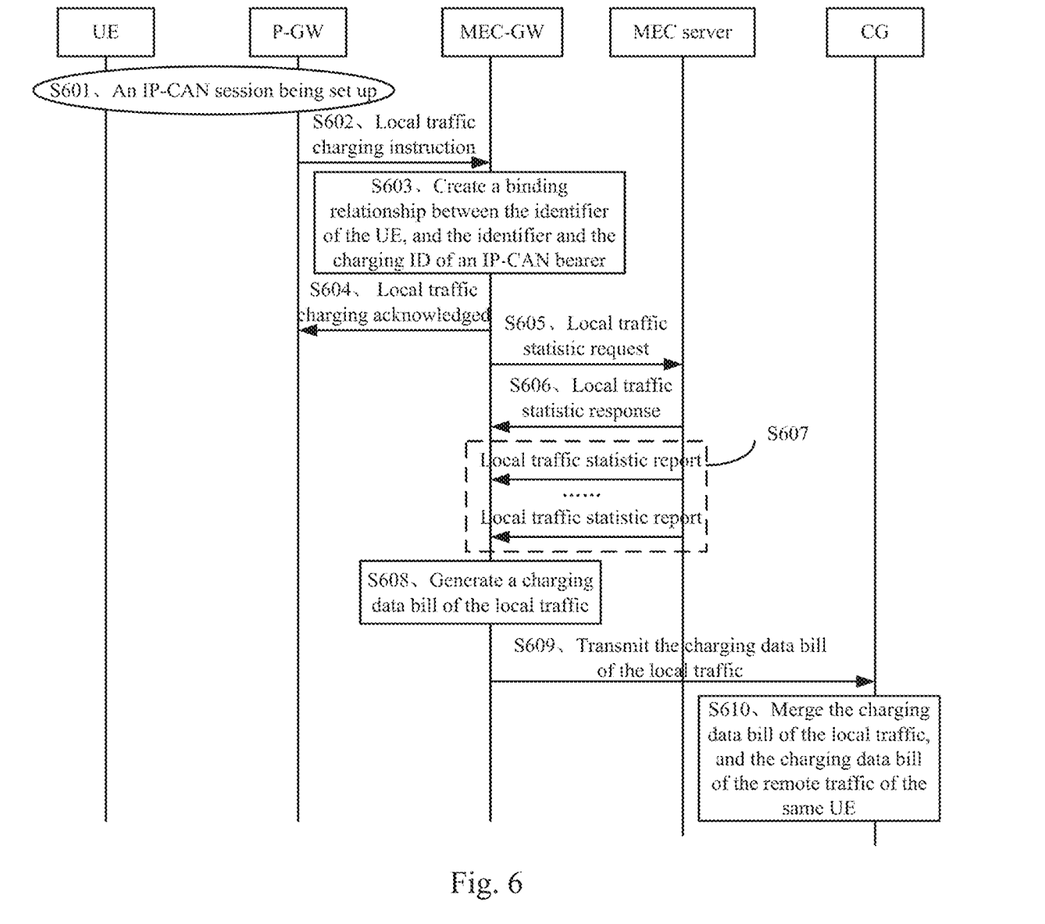
FIG. 6 is a schematic flow chart of a charging method when an IP-CAN session is set up between a UE and a P-GW according to an embodiment of the invention.

FIG. 6 illustrates a schematic flow chart of a charging method when an IP-CAN session is set up between a UE and a PGW according to an embodiment of the invention, where there are network elements involved including a UE, a P-GW, an MEC-GW, an MEC server, and a CG. A charging flow is as follows.

S601: The UE sets up an IP-CAN session with the P-GW.

Also in this operation, the P-GW allocates a charging ID for each IP-CAN bearer of the UE, and transmits the charging ID to the MEC-GW, and the MEC-GW charges the UE for local traffic information of each IP-CAN bearer thereof.

S602. The P-GW transmits an instruction message to the MEC-GW to charge the UE for the local traffic to instruct the MEC-GW to charge the UE for the local traffic.

Here the charging instruction message carries a charging reason (i.e., an IP-CAN session being set up), an identifier of the UE (including an IMSI, an MSISDN, and an IP address of the UE), an identifier of a cell where the UE resides, an address of the P-GW, an identifier of each IP-CAN bearer of the UE, a charging ID corresponding to each IP-CAN bearer of the UE, and a charging rule (here charging based upon traffic).

S603. The MEC-GW creates a binding relationship between the identifier of each IP-CAN bearer of the UE, the charging ID corresponding to each IP-CAN bearer of the UE, and the identifier of the UE upon reception of the instruction message transmitted by the P-GW to charge the UE for the local traffic.

S604. The MEC-GW replies to the P-GW with an acknowledgement message for charging the UE for the local traffic.

S605. The MEC-GW transmits a request message to the MEC server to make a statistic of local traffic information of the UE, where the request message carries the identifier of the UE, the charging rule, and the identifier of each IP-CAN bearer of the UE.

In this way, the MEC server reads the identifier of each IP-CAN bearer of the UE, and reports local traffic information of each IP-CAN bearer of the UE, upon reception of the request message transmitted by the MEC-GW to make a statistic of the local traffic information of the UE.

In this embodiment, the identifier of the UE carried in the request message to make a statistic of the local traffic information of the UE is the IP address of the UE. Of course, the request message can alternatively carry another identifier of the UE.

Particularly the MEC-GW determines an identifier of a local area corresponding to the cell where the UE resides, according to the identifier of the cell where the UE resides; then the MEC-GW determines an MEC server corresponding to the local area according to the identifier of the local area; and finally the MEC-GW transmits the request message to the MEC server corresponding to the local area to make a statistic of the local traffic of the UE.

S606. The MEC server responds to the MEC-GW with a response message for making a statistic of the local traffic information of the UE upon reception of the request message transmitted by the MEC-GW to make a statistic of the local traffic.

S607. The MEC server makes and then reports a statistic of traffic usage information of the local traffic of the UE to the MEC-GW.

In the embodiment of the invention, the MEC server reports periodically.

Furthermore preferably the report message can carry the identifier of the UE, and the identifier of each IP-CAN bearer of the UE, so that the MEC-GW determines the charging ID corresponding to the IP-CAN bearer using the identifier of the IP-CAN bearer according to the binding relationship created in the operation S603, and carries the charging ID in a generated charging data bill.

S608. The MEC-GW generates a charging data bill of the local traffic upon reception of statistic information of the local traffic of the UE reported by the MEC server.

Here the charging data bill of the local traffic includes the following information: the indenter of the UE, the identifier of the local area where the UE is served, an application identifier of the local traffic, traffic information (e.g., an access length of time, an amount of traffic, etc.) for each local traffic application, the address of the P-GW, the charging ID corresponding to each IP-CAN bearer of the UE, etc.

S609. The MEC-GW transmits the generated charging data bill of the local traffic to the CG.

S610. The CG merges the received charging data bill of the local traffic of the UE transmitted by the MEC-GW, and a charging data bill of a non-local traffic of the UE transmitted by an S-GW and the P-GW.

Thereafter the CG can transit a resulting charging data bill of the UE to a BOSS, and the BOSS charges the UE for the traffic. Since an interaction process between the CG and the BOSS is known in the prior art, a repeated description thereof will be omitted here. With the method according to the embodiment of the invention, the UE can be charged for the local traffic and the remote traffic concurrently. Furthermore the BOSS can also set different rates for the local traffic and the remote traffic.

Figure 7:
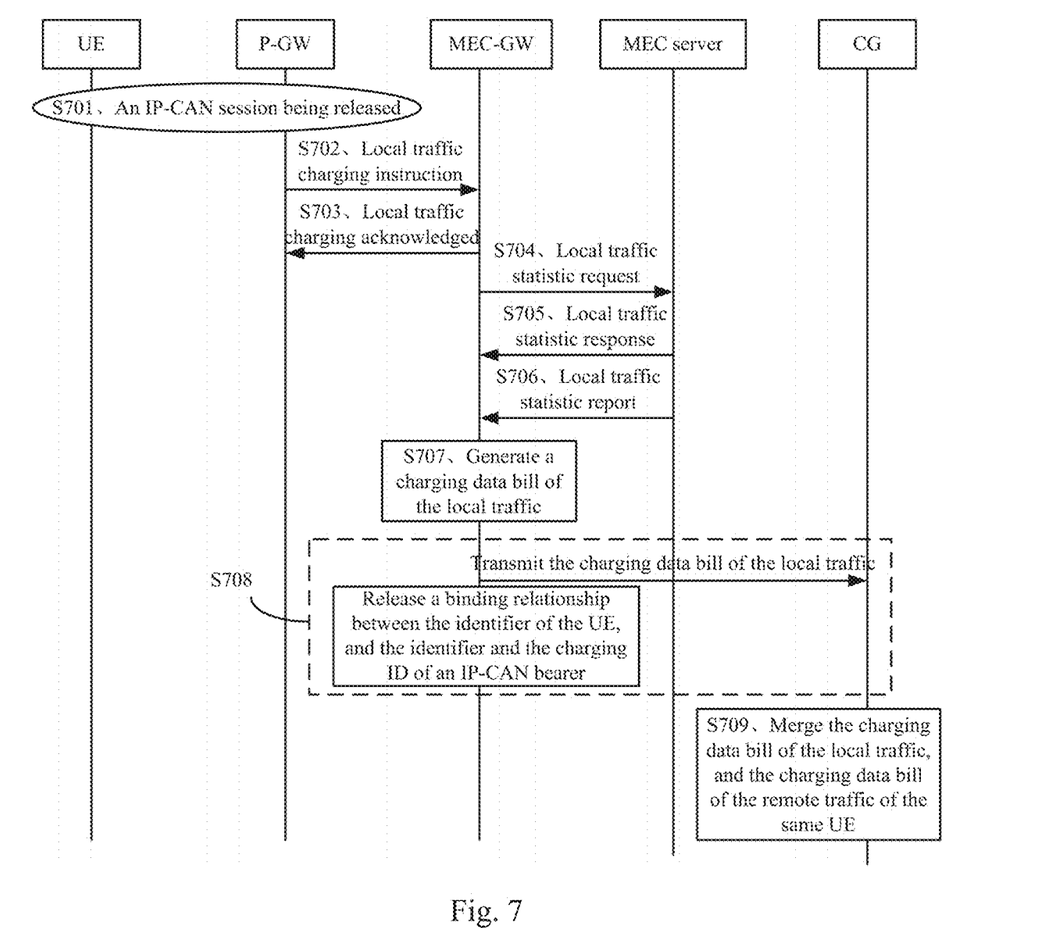
FIG. 7 is a schematic flow chart of a charging method when an IP-CAN session is released between a UE and a P-GW according to an embodiment of the invention.

FIG. 7 illustrates a schematic flow chart of a charging method when an IP-CAN session between a UE and a P-GW is released, where there are network elements including a UE, a P-GW, an MEC-GW, an MEC server, and a CG. A charging flow is as follows.

S701. An IP-CAN session is released between the UE and the P-GW.

Here since the P-GW has allocated a charging ID for each IP-CAN bearer of the UE while the IP-CAN session is being set up between the UE and the P-GW, no charging ID is allocated again for each IP-CAN bearer of the UE.

S702. The P-GW transmits an instruction message to the MEC-GW to charge the UE for a local traffic so as to instruct the MEC-GW to charge the UE for the local traffic.

Here the charging instruction message carries a charging reason (i.e., an IP-CAN session being released), an identifier of the UE (including an IMSI, an MSISDN, and an IP address of the UE), an identifier of a cell where the UE resides, an address of the P-GW, an identifier of each IP-CAN bearer of the UE, a charging ID corresponding to each IP-CAN bearer of the UE, and a charging rule (here charging based upon traffic).

S703. The MEC-GW replies to the P-GW with an acknowledgement message for charging the UE for the local traffic.

S704. The MEC-GW transmits a request message to the MEC server to make a statistic of local traffic information of the UE, where the request message carries the identifier of the UE, the charging rule, and the identifier of each IP-CAN bearer of the UE.

S705. The MEC server replies to the MEC-GW with a response message for making a statistic of the local traffic information of the UE upon reception of the request message transmitted by the MEC-GW to make a statistic of the local traffic information of the UE.

S706. The MEC server makes and then reports a statistic of traffic usage information of the local traffic of the UE to the MEC-GW.

Here the MEC server can report the traffic usage information of the local traffic by reporting only the traffic usage information of the local traffic occurring after the last report.

S707. The MEC-GW generates a charging data bill of the local traffic upon reception of statistic information of the local traffic of the UE reported by the MEC server.

S708. The MEC-GW transmits the generated charging data bill of the local traffic to the CG, and also releases a binding relationship between the identifier of the UE, and each IP-CAN bearer of the UE, and the charging ID corresponding to the each IP-CAN bearer of the UE.

S709. The CG merges the received charging data bill of the local traffic of the UE transmitted by the MEC-GW, and a charging data bill of a non-local traffic of the UE transmitted by an S-GW and the P-GW.

Thereafter the CG transmits a resulting charging data bill of the UE to a BOSS, and the BOSS charges the UE for the traffic.

Figure 8:
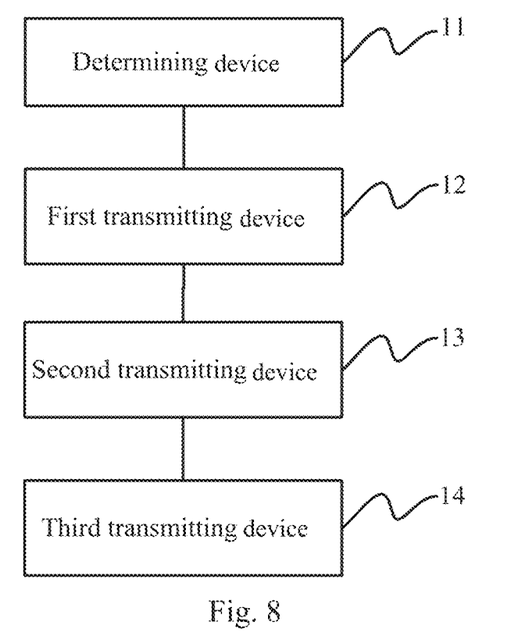
FIG. 8 is a schematic structural diagram of a charging apparatus according to an embodiment of the invention.

FIG. 8 illustrates a charging apparatus according to an embodiment of the invention at an MEC-GW side, where the apparatus includes: a determining module 11 configured to determine that a user Equipment (UE) is to be charged for a local traffic; a first transmitting module 12 configured to transmit a request message to a Mobile Edge Computing (MEC) server to make a statistic of local traffic information of the UE, when the determining module determines that the UE is to be charged for the local traffic; and a second transmitting module 13 configured to transmit a charging data bill of the local traffic to a Charging Gateway (CG), so that the CG merges and then transmits charging data bills of the UE to a Business and Operation Support System (BOSS).

Preferably the determining module 11 is configured to: receive an instruction message transmitted by a Packet data network Gateway (P-GW) to charge the UE for the local traffic; and determine that the UE is to be charged for the local traffic, according to the instruction message to charge the UE for the local traffic.

Preferably the instruction message includes a charging reason, an identifier of the UE, an identifier of a cell where the UE resides, an address of the P-GW, an identifier of each IP-CAN bearer of the UE, a charging Identifier (ID) corresponding to each IP-CAN bearer of the UE, and a charging rule.

Preferably the charging apparatus above at the MEC-GW side further includes a third transmitting module 14 configured, after the determining module 11 determines that the UE is to be charged for the local traffic, and before the second transmitting module 13 transmits the request message to the MEC server to make a statistic of the local traffic information of the UE, to transmit an acknowledgement message for charging the UE for the local traffic to the P-GW.

Preferably the first transmitting module 12 is configured to: determine a local area identifier corresponding to a cell where the UE resides, according to the identifier of the cell where the UE resides; determine an MEC server corresponding to a local area according to the local area identifier; and transmit the request message to the MEC server corresponding to the local area to make a statistic of the local traffic of the UE.

Figure 9:
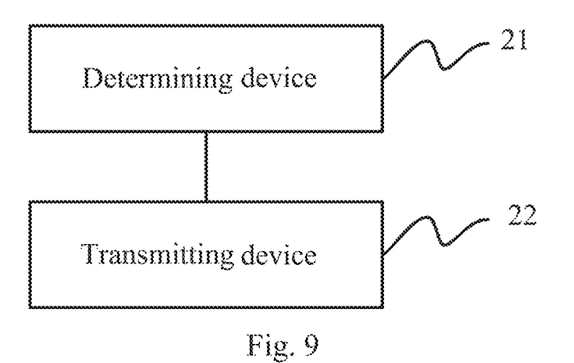
FIG. 9 is a schematic structural diagram of a second charging apparatus according to an embodiment of the invention.

FIG. 9 illustrates a charging apparatus according to an embodiment of the invention at a P-GW side, where the apparatus includes: a determining module 21 configured to determine that a User Equipment (UE) is to be charged for a local traffic; and a transmitting module 22 configured to transmit an instruction message to an MEC-GW to charge the UE for the local traffic.

Preferably the determining module 21 is further configured: after the determining module 21 determines that the UE is to be charged for the local traffic, and before the transmitting module 22 transmits the instruction message to the MEC-GW to charge the UE for the local traffic, to allocate a charging ID for a default IP-CAN bearer of the UE.

Preferably the instruction message transmitted by the transmitting module 22 to charge the UE for the local traffic carries a charging reason, an identifier of the UE, an identifier of a cell where the UE resides, an address of the P-GW, an identifier of each IP-CAN bearer of the UE, a charging ID corresponding to each IP-CAN bearer of the UE, and a charging rule.

Preferably the transmitting module 22 is further configured: after the instruction message is transmitted to the MEC-GW to charge the UE for the local traffic, to receive an acknowledgement message transmitted by the MEC-GW for charging the UE for the local traffic.

Figure 10:
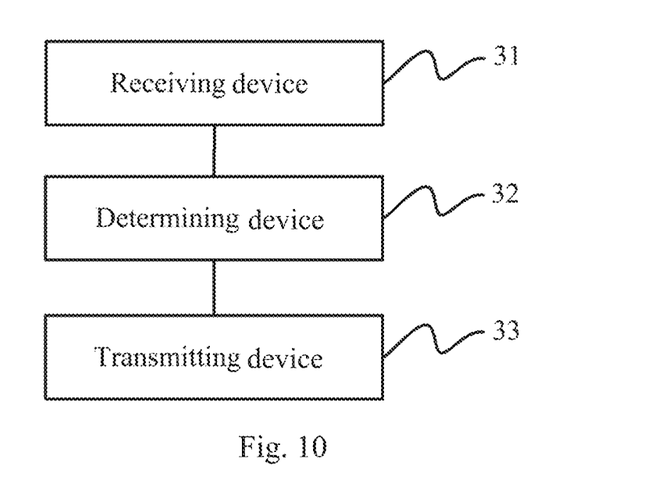
FIG. 10 is a schematic structural diagram of a third charging apparatus according to an embodiment of the invention.

FIG. 10 illustrates a charging apparatus according to an embodiment of the invention at an MEC server side, where the apparatus includes: a receiving module 31 configured to receive a request message transmitted by a Mobile Edge Computing Gateway (MEC-GW) to make a statistic of local traffic information of a User Equipment (UE), where the request message is transmitted by the MEC-GW to an MEC server upon reception of an instruction message transmitted by a Packet data network Gateway (P-GW) to charge the UE for the local traffic.

Preferably the request message transmitted by the MEC-GW to make a statistic of the local traffic information of the UE carries an identifier of the UE, a charging rule, and an identifier of each IP-CAN bearer of the UE.

Where the apparatus further includes: a determining module 32 configured to determine information to be reported among the local traffic information of the UE, according to the request message; and a transmitting module 33 configured to make and then transmit a statistic of the information to be reported, to the MEC-GW, so that the MEC-GW generates and then transmits a charging data bill of the local traffic of the UE to a Charging Gateway (CG) according to the reported information.

Preferably the determining module 32 is configured to: determine local traffic information corresponding to the UE according to the identifier of the UE in the request message; and determine information to be reported among the local traffic information corresponding to the UE according to the charging rule, and the identifier of each IP-CAN bearer of the UE in the request message.

Preferably the transmitting module 33 is further configured: before statistic information to be reported is transmitted to the MEC-GW, to transmit a response message to the MEC-GW for making a statistic of the local traffic information of the UE.

Figure 11:
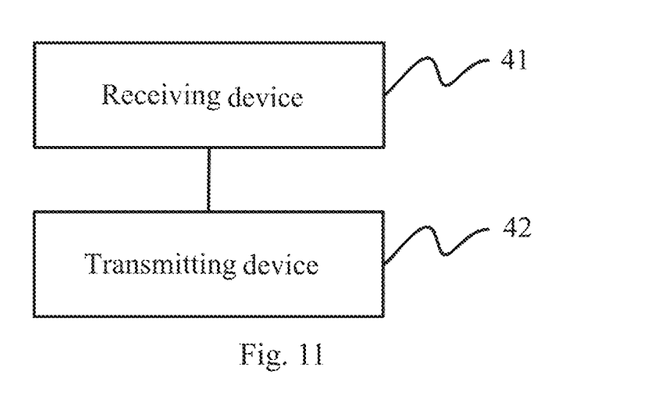
FIG. 11 is a schematic structural diagram of a fourth charging apparatus according to an embodiment of the invention.

FIG. 11 illustrates a charging apparatus according to an embodiment of the invention at a CG side, where the apparatus includes: a receiving module 41 configured to receive a charging data bill of a local traffic of a User Equipment (UE) transmitted by a Mobile Edge Computing Gateway (MEC-GW); and a transmitting module 42 configured to transmit the charging data bill of the local traffic of the UE to a Business and Operation Support System (BOSS).

Preferably the receiving module 41 is further configured to receive a charging data bill of a non-local traffic of the UE transmitted by a Serving Gateway (S-GW) and a Packet data network Gateway (P-GW); and the transmitting module 42 is further configured to merge the charging data bill of the local traffic of the UE, and the charging data bill of the non-local traffic of the UE transmitted by the S-GW and the P-GW, and to transmit a resulting charging data bill of the UE to the BOSS.

Preferably the transmitting module 42 is configured to merge the charging data bill of the local traffic of the UE, and the charging data bill of the non-local traffic of the UE transmitted by the S-GW and the P-GW by: merging charging data bills of the UE according to an identifier of the UE, a charging ID corresponding to each IP-CAN bearer of the UE, and an address of the P-GW, in the charging data bill of the local traffic, and the identifier of the UE, the charging ID corresponding to each IP-CAN bearer of the UE, an address of the S-GW, and the address of the P-GW, in the charging data bill of the non-local traffic.

In the embodiments of the invention, the respective functional modules above can be embodied by a processor and other physical devices with functions of transmitting, receiving, etc.

The processor can be a Central Processing Unit (CPU), an Application Specific Integrated Circuit (ASIC), a Field-Programmable Gate Array (FPGA), or a Complex Programmable Logic Device (CPLD).

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A charging method for traffic data flow of UE, applicable to a system including a Packet data network Gateway (P-GW), a Mobile Edge Computing (MEC) server, and a Charging Gateway (CG), wherein the system further comprises a Mobile Edge Computing Gateway (MEC-GW) responsible for controlling charging for a local traffic, the MEC-GW is a logical and functional entity, and is deployed separately in a physical device, or can be deployed in a physical device together with a Serving Gateway (S-GW) and the P-GW which are responsible for generating and transmitting a charging data bill of a non-local traffic of the UE to the CG, the method comprising:

upon determining that a user Equipment (UE) is to be charged for a local traffic, creating, by the MEC-GW, a binding relationship between the identifier of the UE, and an IP Connectivity Access Network (IP-CAN) bearer identifier of the UE, and a charging ID corresponding to the IP-CAN bearer identifier of the UE; and transmitting, by the MEC-GW, a request message to the MEC server to make a statistic of local traffic information of the UE; the request message comprises an identifier of the UE, a charging rule of the local traffic information, and an identifier of each IP-CAN bearer of the UE;

receiving, by the MEC-GW, the statistic of the local traffic information of the UE transmitted by the MEC server, and generating a charging data bill of the local traffic of the UE according to the statistic of the local traffic information of the UE; the charging data bill comprises: the identifier of the UE, the identifier of the local area where the UE is served, the statistic of the local traffic information, the address of the P-GW, and the charging ID corresponding to each IP-CAN bearer of the UE; and transmitting, by the MEC-GW, the charging data bill of the local traffic of the UE to the CG.

2. The method according to claim 1, wherein determining, by the MEC-GW, that the UE is to be charged for the local traffic comprises:

receiving, by the MEC-GW, an instruction message transmitted by the P-GW to charge the UE for the local traffic; and determining, by the MEC-GW, that the UE is to be charged for the local traffic, according to the instruction message to charge the UE for the local traffic.

3. The method according to claim 2, wherein the instruction message comprises an identifier of a cell where the UE resides: and transmitting, by the MEC-GW, the request message to the MEC server to make the statistic of the local traffic information of the UE comprises:

determining, by the MEC-GW, an identifier of a local area corresponding to the cell where the UE resides, according to the identifier of the cell where the UE resides;

determining, by the MEC-GW, an MEC server corresponding to the local area according to the identifier of the local area; and transmitting, by the MEC-GW, the request message to the MEC server corresponding to the local area to make the statistic of the local traffic of the UE.

4. The method according to claim 1, wherein after the MEC-GW determines that the UE is to be charged for the local traffic, and before the MEC-GW transmits the request message to the MEC server to make the statistic of the local traffic information of the UE, the method further comprises:

transmitting, by the MEC-GW, an acknowledgement message for charging the UE for the local traffic to the P-GW.

5. A charging method for traffic data flow of UE, applicable to a system including a Packet data network Gateway (P-GW), a Mobile Edge Computing (MEC) server, and a Charging Gateway (CG), wherein the system further comprises a Mobile Edge Computing Gateway (MEC-GW) responsible for controlling charging for a local traffic, the MEC-GW is a logical and functional entity, and is deployed separately in a physical device, or can be deployed in a physical device together with a Serving Gateway (S-GW) and the P-GW which are responsible for generating and transmitting a charging data bill of a non-local traffic of the UE to the CG, the method comprising:

receiving, by the MEC server, a request message transmitted by the MEC-GW to make a statistic of local traffic information of a User Equipment (UE), wherein the request message is transmitted by the MEC-GW to the MEC server upon reception of an instruction message transmitted by the P-GW to charge the UE for the local traffic; the request message comprises an identifier of the UE, a charging rule of the local traffic information, and an identifier of each IP-CAN bearer of the UE;

determining, by the MEC server, the local traffic information of the UE to be reported, according to the request message; and making and then transmitting, by the MEC server, the statistic of the local traffic information of the UE to be reported, to the MEC-GW, so that the MEC-GW generates and then transmits a charging data bill of the local traffic of the UE to the CG according to the statistic of the local traffic information of the UE transmitted by the MEC server, wherein, the charging data bill comprises: the identifier of the UE, the identifier of the local area where the UE is served, the statistic of the local traffic information, the address of the P-GW, and the charging ID corresponding to each IP-CAN bearer of the UE.

6. The method according to claim 5, determining, by the MEC server, the local traffic information of the UE to be reported, according to the request message comprises:

determining, by the MEC server, the local traffic information of the UE according to the identifier of the UE; and determining, by the MEC server, the local traffic information of the UE to be reported according to the charging rule of the local traffic information and the identifier of each IP-CAN bearer of the UE.

7. The method according to claim 5, wherein before the MEC server makes and then transmits the statistic of the local traffic information of the UE to be reported, to the MEC-GW, the method further comprises:

transmitting, by the MEC server, to the MEC-GW a response message for making the statistic of the local traffic information of the UE.

8. A charging method for traffic data flow of UE, applicable to a system including a Packet data network Gateway (P-GW), a Mobile Edge Computing (MEC) server, and a Charging Gateway (CG), wherein the system further comprises a Mobile Edge Computing Gateway (MEC-GW) responsible for controlling charging for a local traffic, the MEC-GW is a logical and functional entity, and is deployed separately in a physical device, or can be deployed in a physical device together with a Serving Gateway (S-GW) and the P-GW which are responsible for generating and transmitting a charging data bill of a non-local traffic of the UE to the CG, the method comprising:

receiving, by the CG, a charging data bill of a local traffic of a User Equipment (UE) transmitted by the MEC-GW;

wherein, the charging data bill is generated by the MEC-GW according to a statistic of local traffic information of the UE and comprises: the identifier of the UE, the identifier of the local area where the UE is served, the statistic of the local traffic information, the address of the P-GW, and the charging ID corresponding to each IP-CAN bearer of the UE; the statistic of local traffic information of the UE is generated and transmitted by the MEC server upon receiving a request message to make a statistic of local traffic information of the UE; the request message comprises an identifier of the UE, a charging rule of the local traffic information, and an identifier of each IP-CAN bearer of the UE; and transmitting, by the CG, the charging data bill of the local traffic of the UE to a Business and Operation Support System (BOSS).

9. The method according to claim 8, wherein the method further comprises:
merging, by the CG, the charging data bill of the local traffic of the UE, and the charging data bill of the non-local traffic of the UE transmitted by the S-GW and the P-GW, and transmitting a resulting charging data bill of the UE to the BOSS.

10. The method according to claim 9, wherein merging, by the CG, the charging data bill of the local traffic of the UE, and the charging data bill of the non-local traffic of the UE transmitted by the S-GW and the P-GW comprises:
merging, by the CG, charging data bills of the UE according to an identifier of the UE, a charging ID corresponding to each IP Connectivity Access Network (IP-CAN) bearer of the UE, and an address of the P-GW, in the charging data bill of the local traffic, and the identifier of the UE, the charging ID corresponding to each IP-CAN bearer of the UE, an address of the S-GW, and the address of the P-GW, in the charging data bill of the non-local traffic.

11. A charging apparatus for traffic data flow of UE, applicable to a system including a Packet data network Gateway (P-GW), a Mobile Edge Computing (MEC) server, a Charging Gateway (CG), and the charging apparatus, wherein the charging apparatus is a Mobile Edge Computing Gateway (MEC-GW) responsible for controlling charging for a local traffic, wherein the MEC-GW is a logical and functional entity, and is deployed separately in a physical device, or can be deployed in a physical device together with a Serving Gateway (S-GW) and the P-GW which are responsible for generating and transmitting a charging data bill of a non-local traffic of the UE to the CG, wherein the apparatus comprising at least one processor and a memory; wherein the memory is configured to store computer readable program codes, and the at least one processor is configured to execute the computer readable program codes to:
determine that a user Equipment (UE) is to be charged for a local traffic;
transmit a request message to the MEC server to make a statistic of local traffic information of the UE upon determining that the UE is to be charged for the local traffic;

wherein, the request message comprises an identifier of the UE, a charging rule of the local traffic information, and an identifier of each IP-CAN bearer of the UE, and transmit a charging data bill of the local traffic of the UE to the CG;

wherein, the charging data bill comprises: the identifier of the UE, the identifier of the local area where the UE is served, the statistic of the local traffic information, the address of the P-GW, and the charging ID corresponding to each IP-CAN bearer of the UE.

12. The charging apparatus according to claim 11, wherein the at least one processor is further configured to execute the computer readable program codes to:
receive an instruction message transmitted by the P-GW to charge the UE for the local traffic; and
create a binding relationship between the identifier of the UE, and an IP Connectivity Access Network (IP-CAN) bearer identifier of the UE, and a charging ID corresponding to the IP-CAN bearer identifier of the UE;
determine that the UE is to be charged for the local traffic, according to the instruction message to charge the UE for the local traffic.

13. The charging apparatus according to claim 12, wherein the instruction message comprises an identifier of a cell where the UE resides; and
the at least one processor is further configured to execute the computer readable program codes to:
determine a local area identifier corresponding to the cell where the UE resides, according to the identifier of the cell where the UE resides;
determine an MEC server corresponding to a local area according to the local area identifier; and
transmit the request message to the MEC server corresponding to the local area to make the statistic of the local traffic of the UE.

14. The charging apparatus according to claim 11, wherein the at least one processor is further configured to execute the computer readable program codes to: after determining that the UE is to be charged for the local traffic, and before transmitting the request message to the MEC server to make the statistic of the local traffic information of the UE, transmit an acknowledgement message for charging the UE for the local traffic to the P-GW.

* * * * *